T. H. JACKSON.
GAME APPARATUS.
APPLICATION FILED SEPT. 23, 1912.
1,053,817.
Patented Feb. 18, 1913.
3 SHEETS—SHEET 1.
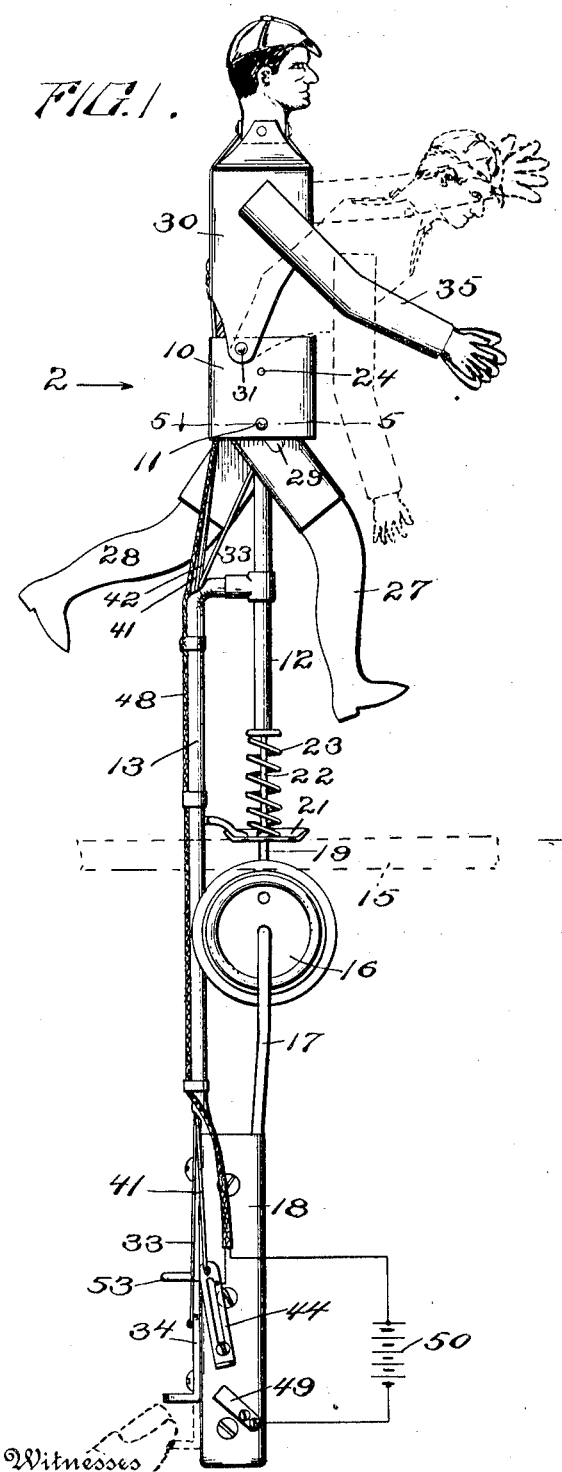
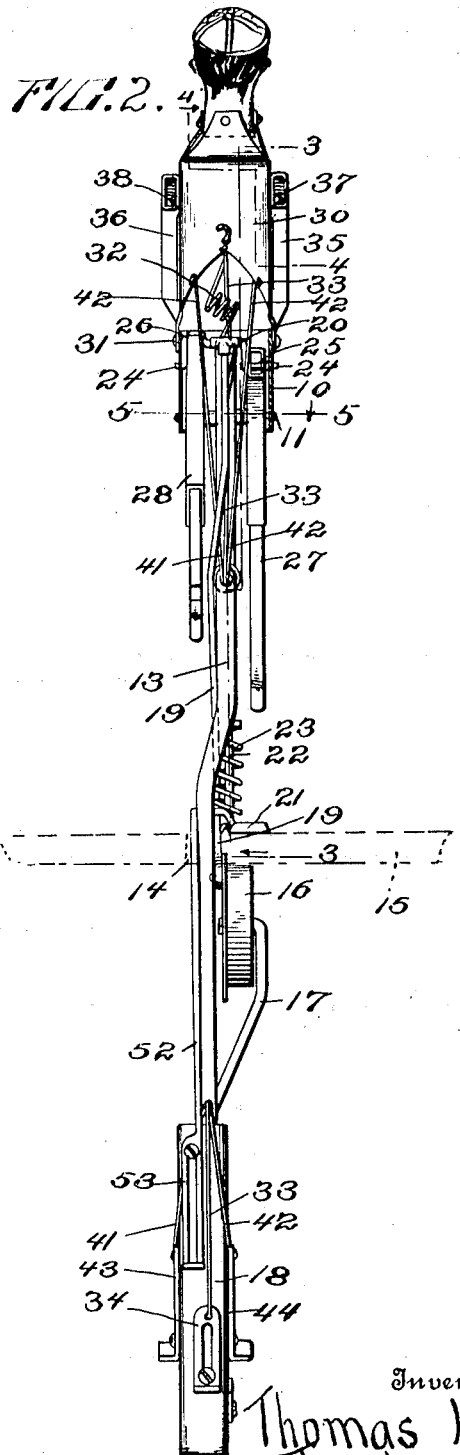
Inventor
Thomas H. Jackson
By Mason Fenwick Lawrence,
Attorneys
Witnesses
R. S. Trogner
L. B. Morrill

T. H. JACKSON.
GAME APPARATUS.
APPLICATION FILED SEPT. 23, 1912.

1,053,817.

Patented Feb. 18, 1913.
3 SHEETS—SHEET 2.

Witnesses
R. S. Trogner
L. B. Morrill

Inventor
Thomas H. Jackson,
By Mason Fenwick Lawrence,
Attorneys

T. H. JACKSON.
GAME APPARATUS.
APPLICATION FILED SEPT. 23, 1912.
1,053,817.
Patented Feb. 18, 1913.
3 SHEETS—SHEET 3.
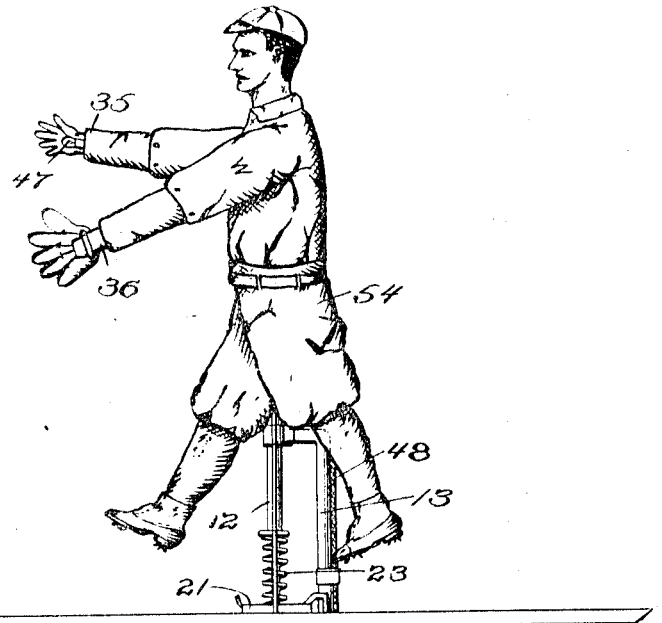
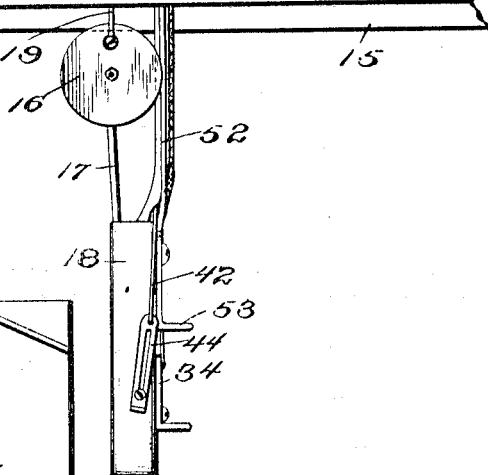
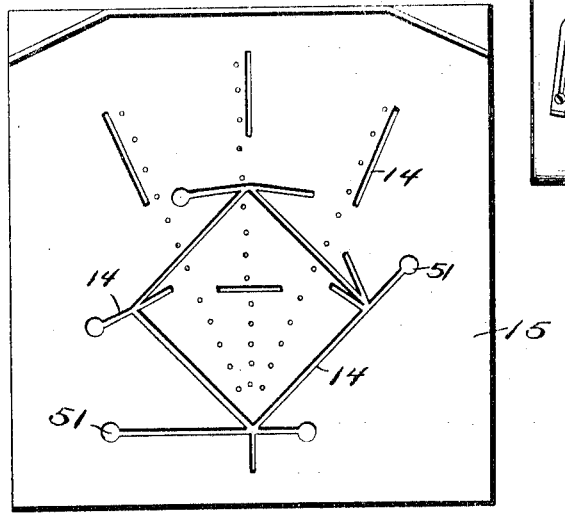
Witnesses
Inventor
Thomas H. Jackson
By Mason Fenwick Lawrence,
Attorneys

UNITED STATES PATENT OFFICE.

THOMAS H. JACKSON, OF SCRANTON, PENNSYLVANIA.

GAME APPARATUS.

1,053,817.

Specification of Letters Patent. Patented Feb. 18, 1913.

Application filed September 23, 1912. Serial No. 721,953.

*To all whom it may concern:*

Be it known that I, THOMAS H. JACKSON, a citizen of the United States, residing at Scranton, in the county of Lackawanna and State of Pennsylvania, have invented certain new and useful Improvements in Game Apparatus; and I do hereby declare the following to be a full, clear, and exact description of the invention, such as will enable others skilled in the art to which it appertains to make and use the same.

This invention relates to automatic figures and has for an object to provide a figure representing a base-ball player with mechanism for operating the player in representation of the plays being made upon an actual base-ball field.

A further object of the invention is to provide a jointed articulated figure having means for operating the legs in simulation of running as the organized structure is moved bodily and with other means for manually causing the figure to stoop and to move its arms in representation of various actions in playing a game of base-ball.

A further object of the invention is to provide means for electrically illuminating a bulb in one of the hands of the figure to indicate by the lighting and extinguishing of such bulb the catching and throwing of a ball.

A further object of the invention is to provide a figure having connection through slots in a board representing a base-ball field with apparatus below the board for manually operating the figure to perform the several feats above enumerated.

With these and other objects in view the invention comprises certain novel constructions, combinations and arrangement of parts as will be hereinafter more fully described and claimed.

Figure 3:
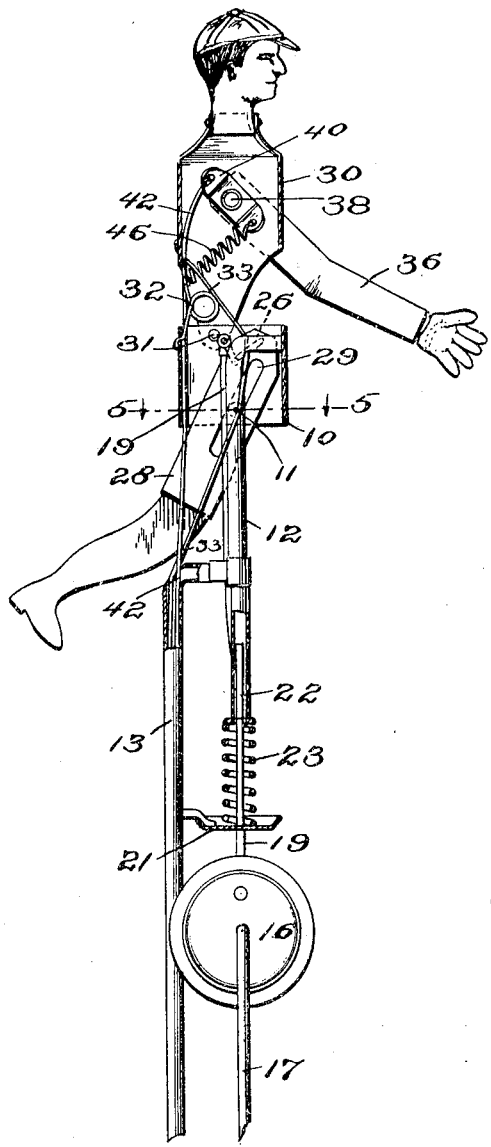
Figure 4:
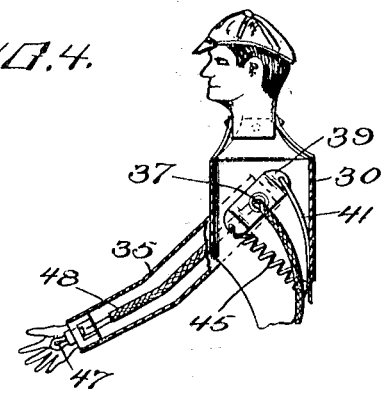
Figure 6:
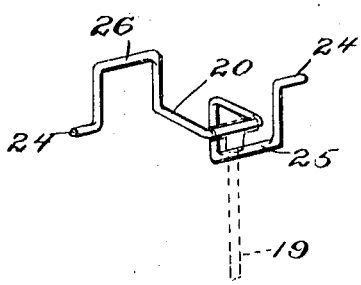
Figure 5:
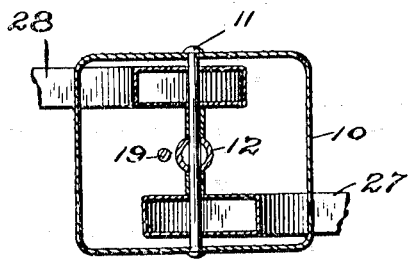

In the drawings: Figure 1 is a view of the figure in side elevation showing in dotted lines the stooping position and the movement of the arms, such figure being shown unclothed. Fig. 2 is a view of the figure in rear elevation as indicated by arrow 2 at Fig. 1, parts of the structure being broken away to show the operating parts. Fig. 3 is a sectional view of the figure taken on line 3—3 of Fig. 2. Fig. 4 is a sectional view of the figure taken on line 4—4 of Fig. 2. Fig. 5 is a transverse sectional view taken on lines 5—5 of Figs. 1, 2 and 3. Fig. 6 is a perspective view of the crank shaft employed to give motion to the figure. Fig. 7 is a view in side elevation of the figure mounted upon a strip representing a board the figure being shown clothed. Fig. 8 is a top plan view of a board with which the figure and others of a similar make may be operated.

Like characters of reference designate corresponding parts throughout the several views.

The figure which forms the subject matter of the application comprises an abdominal band 10 through which extends a pintle 11 serving to attach said abdominal band rigidly to an upright 12. The upright 12 is carried by a tube 13 bent and proportioned to pass through a slot 14 in a board 15 shown in plan at Fig. 8 representing a conventional base-ball field. Beneath the board 15 a flanged wheel 16 is journaled upon a rod 17 which is in turn rigidly connected with the tube 13 by means of a block 18 which is in position for manual engagement and operation beneath the board.

The wheel is provided with a pitman 19 which extends upwardly through the slot 14 and upwardly beside the tube 13 and connects with the crank shaft 20 shown in perspective at Fig. 6. The movement of the block manually under the board serves to rotate the flanged wheel 16 as will be apparent and to reciprocate the pitman 19. The leverage of the crank shaft 20 is such that the said shaft does not rotate by the reciprocation of the pitman but is oscillated thereby. To hold the wheel yieldingly in frictional engagement with the board to cause such rotation a shoe 21 is provided mounted upon a plunger 22, which plunger is mounted to slide in the upright 12 and is held yieldingly in engagement with the board by a spring 23.

The crank shaft 20 is provided with trunnions 24 journaled in the abdominal band 10 and is provided with crank arms 25 and 26 upon which are pivotally mounted respectively leg members 27 and 28, such leg members being slotted as indicated at 29 and the slots embracing the pintle 11 to permit a sliding movement of the leg members upon such pintle under the action of the crank arms 25 and 26 and the crank shaft 20. As the crank shaft 20 does not rotate it will be apparent that the extremities of the cranks 25 and 26 will be oscillated backward and forward to simultaneously move backward and forward the upper ends of the leg members 27 and 28, and the lower ends or feet of the leg members to be swung in opposite directions. It will be apparent, therefore, that as the figure is moved manually along the board the rotation of the wheel 16 will serve to swing the legs in simulation of walking movement.

To the abdominal band 10 a body portion 30 is pivotally connected as at 31 and capable of bending upon such pivot as indicated in dotted lines in Fig. 1. To hold such body portion normally erect a spring 32 is connected at its opposite ends to the abdominal band 10 and to the body portion 30 which as indicated in full lines holds such figure normally erect but permits the body portion to bend forwardly as indicated in dotted lines in Fig. 1. To produce such bending movement manually at will a cord or wire 33 is attached to the back of the body portion 30 and extending over any convenient stationary abutment shown at Fig. 3, as the upper curved end of the upright 12, passes downwardly through the tube 13 and is connected with a sliding clip 34 carried upon the block 18. It will be apparent, therefore, that when the clip 34 is depressed manually as indicated in dotted lines at Fig. 1 the figure will stoop forwardly as indicated also in dotted lines in the same figure and will promptly resume erect position upon releasing the clip 34 by reason of the action of the spring 32. To the body portion 30 are also pivoted arm members 35 and 36, as at 37 and 38 respectively. The arms are mounted to turn upon their pivots in vertical planes. Within the body portion 30 levers 39 and 40 are respectively connected rigidly with the pivots 37 and 38 and cords or wires 41 and 42 are connected with such levers and pass downwardly through the tube 13, as indicated at Figs. 1, 2 and 3 and are connected respectively with clips 43 and 44 mounted upon the opposite sides of the block 18 and in position to be manually engaged by the operator beneath the board. It will be apparent, therefore, that when the clips 43 and 44 are either or both depressed the arms 35 and 36 will be raised, as indicated in dotted lines in Fig. 1. To retract such arms and permit such raising yielding springs 45 and 46 are employed as indicated at Figs. 3 and 4 connected with the ends of the levers 39 and 40 opposite the connection of the cords 41 and 42, such springs tending to return the arms to position adjacent the sides of the figure. As the clips 43 and 44 are manipulated, therefore, either or both of the arms of the figure may be raised in response to such manual operation of the clips.

In one of the hands of the figure supposed to represent the right hand an electric bulb 47 is positioned and connected by means of an electrical conductor 48 one end with the clip 44 as indicated at Fig. 1 and the opposite end with a contact member 49 carried by the block 18 in position to be engaged by the clip when depressed. It will be apparent, therefore, that when the clip 44 is depressed and such clip engages the contact 49 current from the battery 50 will pass through the bulb 47 to illuminate the same. The arm 35 carrying such bulb is raised only to indicate a catch and when so raised the light is exhibited from the bulb 47 to give visual information of such catch.

To place the figures in position upon the board 15 holes 51 are provided proportioned to permit the figures to be passed upwardly or downwardly through such holes and to further permit such action the shoe 21 is provided with a rod 52 which extends downwardly by the side of the tube 13 and connects with a clip 53 by raising which manually the shoe may be lifted and the tension of the wheel 16 relieved so that the figure may be inserted and removed conveniently through the openings 51.

As indicated at 54 in Fig. 7 it is intended that the figure be clothed to more nearly represent a player and to obscure the working parts as above described so that in operation the actions of the figure will apparently be automatic.

It is believed that from the foregoing description of the construction and operation of the individual parts a complete understanding of the organized structure and the operation of the same will be obvious.

I claim:

1. The combination with a board having a slot therein, of a figure having movable parts, a rod supporting the figure above the board, means to manipulate the figure from beneath the board, and a wheel engaging the board and adapted to actuate the working parts.

2. The combination with a board having a slot, of a tube extending through the slot, a figure having moving parts representing legs carried rigidly upon the tube, a wheel journaled upon the tube beneath the board, means beneath the board to move the figure with the wheel in frictional engagement with the board and means actuated from the wheel for moving the movable parts.

3. In a play exhibiting figure, an abdominal portion, legs mounted to swing and slide upon the abdominal portion, a crank shaft journaled in the abdominal portion and adapted to actuate such leg members, a wheel and a pitman connected with and adapted to actuate the crank shaft.

4. In a play figure, an abdominal portion, legs mounted to swing upon the abdominal portion, a crank shaft journaled upon the abdominal portion and having cranks connected with the legs, a pitman rod connected with the crank shaft, and a pitman wheel connected with the pitman.

5. In a play figure, an abdominal portion, legs mounted to swing upon the abdominal portion, a wheel, means connecting the wheel with and adapted to swing the legs, a body portion pivotally connected with the abdominal portion, a spring adapted to hold the body portion normally yieldingly erect, a cable adapted to move the body portion to stooping position against the tension of the spring, arms pivotally connected with the body portion, cables adapted to move the arms independently, and springs adapted to return the arms to normal position.

6. In a play figure, a body portion, an arm member pivoted to the body portion, means to move the arm member, an electric light bulb carried by the hand at the extremity of the arm member, an electric circuit connected with the bulb, and means for closing the circuit when the arm is raised.

7. In a play figure, a body portion, an arm pivotally connected with the body portion, a cable adapted to raise the arm, a manual connected with the end of the cable for convenience in operation, an electric bulb carried by the hand at the extremity of the arm, a circuit including the bulb and manual, and a contact introduced in the circuit spaced from the manual and adapted to be engaged thereby when the manual is moved to move the arm.

8. In a play figure, an upright, a shoe carried by the upright and movable yieldingly relative thereto, a block below the shoe, a connecting member between the upright and the block, a wheel journaled upon the block and supported from the shoe and a manual carried by the block adapted to move the shoe away from the wheel.

In testimony whereof I affix my signature in presence of two witnesses.

THOMAS H. JACKSON.

Witnesses:
W. W. BAYLOR,
L. P. WEDEMAN.